July 17, 1962 W. HALPERN 3,044,325
APPARATUS FOR DEBURRING AND CHAMFERING IN COMBINATION
WITH DRILL OR REAMER OR THE LIKE
Filed Feb. 16, 1961
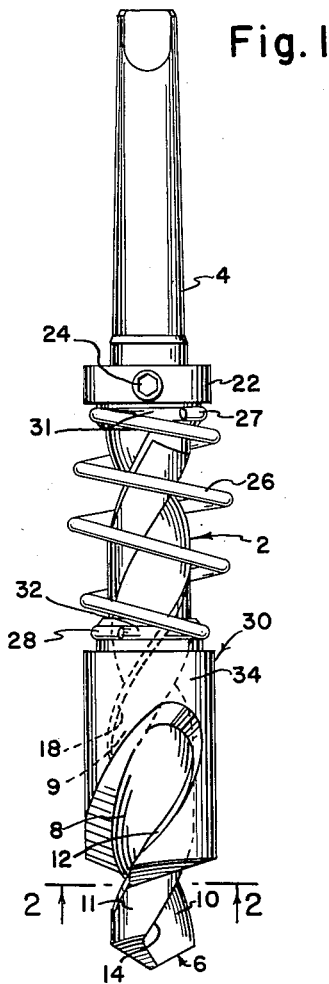
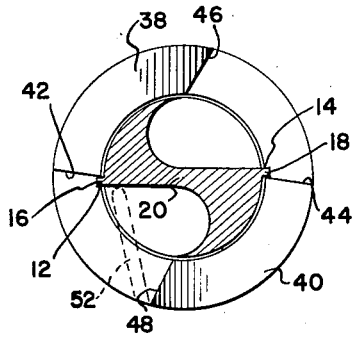
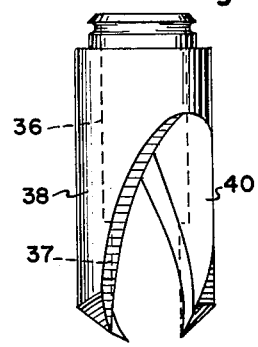
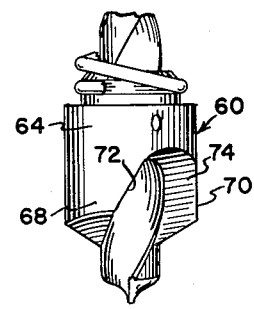
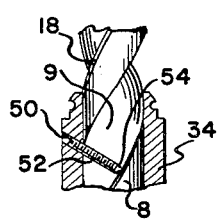
*INVENTOR.*
William Halpern
BY
*Curtis, Morris, & Safford*
ATTORNEYS

United States Patent Office 3,044,325
Patented July 17, 1962

3,044,325
APPARATUS FOR DEBURRING AND CHAMFERING IN COMBINATION WITH DRILL OR REAMER OR THE LIKE
William Halpern, Haviland Road, Harrison, N.Y.
Filed Feb. 16, 1961, Ser. No. 89,719
7 Claims. (Cl. 77—66)

This invention relates to drilling and/or reaming and chamfering, and to deburring holes, and more in particular to apparatus for performing deburring and chamfering operations simultaneously with drilling and reaming operations in metal and/or other materials, or as an adjunct thereto.

An object of this invention is to provide improved means for removing burrs from drilled and/or reamed holes. A further object is to provide improved deburring apparatus. A further object is to provide apparatus for drilling and/or reaming and deburring essentially as a single operation. A further object is to provide improved means for chamfering holes while the hole is being drilled or reamed, or immediately thereafter. It is a further object to provide deburring and chamfering apparatus as an accessory or component of metal working mechanisms. It is a further object to provide deburring and chamfering apparatus in combination with a master or fixed drill jig bushing, using the same apparatus for the deburring or chamfering tool as a slip renewable bushing.

These and other objects will be in part obvious, and in part pointed out below.

In the drawings:

FIGURE 1 is a side elevation of one embodiment of the invention;

FIGURE 2 is an enlarged sectional view on the line 2—2 of FIGURE 1;

FIGURE 3 is a side elevation of the deburring and chamfering unit of FIGURES 1 and 2;

FIGURE 4 is a fragmentary sectional view showing details of the structure of FIGURES 1 and 2; and FIGURE 5 is a view similar to FIGURE 1, showing another embodiment of the invention.

Referring to FIGURE 1 of the drawings, illustratively, a drill 2 has a shank 4 and a drill body 6, with two spiral flutes 8 and 10 therein separated by spiral lands 9 and 11. Two cutting edges 12 and 14 extend respectively along the leading edges of the two lands 9 and 11, respectively, and hence along the trailing edges of the two flutes. Adjacent cutting edge 12, there is a margin 16, and adjacent cutting edge 14 there is an identical margin 18. As shown best in FIGURE 2, the two flutes are separated along the axis of the drill by a web 20.

Mounted upon drill 2 are: a collar 22 which is clamped to shank 4 by a set screw 24; a spiral spring 26; and, a deburring and chamfering unit 30. Spring 26 has resilient ring portions 27 and 28 at its top and bottom ends, respectively, and these are nested in annnular grooves 31 and 32, respectively, in collar 22 and unit 30. Hence, ring portions 27 and 28 provide sliding relationships which permit unit 30 to turn relative to the drill, but the unit is resiliently supported on the drill in the predetermined axial position. Unit 30 has an upper body portion 34 with an internal bore 36, the diameter of which is somewhat greater than the margin diameter of the drill. At the lower portion of unit 30, the central bore 37 is of slightly lesser diameter.

Projecting downwardly from body portion 34 are two integral spiral deburring and chamfering tool elements 38 and 40. Tool elements 38 and 40 are identical, and they are positioned respectively along the trailing ledges of the drill margins 16 and 18. The tool elements 38 and 40 have angular cutting edges 42 and 44, respectively, each of which extends radially outwardly and upwardly from the trailing ledge of the adjacent margin. The radius of the smaller bore 37 of unit 30 is only slightly greater than the minimum radius of the drill lands 9 and 11, so that the lower portions of the tool elements 38 and 40 contact the land surfaces in the trailing direction continuously from the respective trailing ledges of the margins. Hence, the cutting edges 42 and 44 project radially inwardly beyond their respective margins and terminate at a smaller radius than the drill cutting edges 12 and 14. During assembly, the larger diameter bore 36 permits the ready entry of the drill into unit 30, and thereafter provides a guiding surface or journal around the margins and the lower portion of the unit is journaled on the lands in trailing relationship to the margins. The upward angle of cutting edges 42 and 44 determines the angle of the chamfer produced on the work piece. The tool elements 38 and 40 have a spiral formation of the same rake angle or pitch as the lands and flutes of the drill, and their trailing edge surfaces 46 and 48 are at the respective trailing edges of the lands. Hence, the chips from the drill pass from the flutes without interference by the tool elements 38 and 40.

As shown in FIGURES 2 and 4, threaded into a bore 50 in the body portion 34 of unit 30 is a set screw 52, the forward end of which projects into flute 8 and rests against the leading surface of land 9. Rotatably mounted in a cup in the end of set screw 52 is a ball bearing 54 which provides antifriction contact with the drill wall. As shown in FIGURE 2, set screw 52 produces a holding force near the outer edge of the flute and (FIGURE 4) the set screw projects downwardly at an angle of the order of 28°. Set screw 52 is adjusted to hold the leading edges of tool elements 38 and 40 into loose contact with the trailing ledges of the respective margins. Hence, unit 30 may be moved axially along the drill against the resilient action of spring 26. During such movement, unit 30 follows the spiral of the drill by virtue of the guiding action of screw 52 riding upon the side wall of the land, and the action of the leading edges of tool elements 38 and 40 riding along the trailing ledges of the margins 16 and 18. That is, the engagement of the leading edges of the tool elements 38 and 40 with the trailing ledges of margins 16 and 18 prevents counterclockwise movement of unit 30 relative to the drill, except along the spiral of the drill, whereas screw 52 prevents such relative clockwise movement.

Drill 2 produces a hole having the diameter of the margins and the cutting edges 12 and 14, and the burr forms radially outwardly at the entrance to the hole. The cutting edges 42 and 44 of tool elements 38 and 40 extend radially inwardly beyond the outer surfaces of the drill margins, so that these cutting edges extend from within the drilled hole radially outwardly beyond the zone where the burr forms and beyond normal limit of a chamfer. In the showing of FIGURE 1, it is assumed that a relatively shallow hole is drilled into the work piece, and there is a resulting burr at the entrance to the hole. Unit 30 is resiliently supported by spring 26 in the position shown, so that it moves into contact with the work piece when the drill is approaching the downward limit of its movement. Hence, the cutting edges 42 and 44 move into contact with the burr and remove it, and they cut a chamfer around the drilled hole. The drill then moves upwardly away from the work piece carrying unit 30 with it. The resilient mounting of unit 30 insures the proper cutting action by edges 42 and 44, even though the downward movement of the drill is greater than the cutting rate of edges 42 and 44. That is, these cutting edges move into contact with the work piece, and are urged downwardly by the resilient action of the spring; but, the characteristics of the spring are such that unit 30 is urged downwardly with no more force than is necessary to produce the desired cutting action, even though the drill and collar 22 move downwardly at a more rapid rate.

Set screw 52 rides along its flute surface and holds unit 30 in the proper relationship with respect to the lands of the drill. Hence, unit 30 rotates constantly with the drill, except that it turns relative to the drill as it moves upwardly and downwardly along the drill. It has been pointed out above that screw 52 extends downwardly at an angle of 28°, and this has proven to be very satisfactory. With this arrangement, unit 30 moves up without binding. Also, it is positioned so that it does not interfere with the passage of chips upwardly along the flute.

The invention contemplates that a unit 30 may be used with a reamer as well as a drill. Also, unit 30 may be used for deburring and chamfering, or for either of these operations without regard to the other. Also, certain aspects of the invention are applicable to countersinking, while drilling or reaming. For some drilling operations, the rotation of the drill or reamer is reversed during its upward movement away from the work piece. With such an operation, tool elements 38 and 40 may be provided with cutting edges which trail during the drilling or reaming operation, and therefore are not effective until the rotation of the drill or reamer is reversed. With such an arrangement, the deburring and chamfering actions may be controlled very accurately and independently of the drilling operations.

In the illustrative embodiment of the invention shown in FIGURES 1 to 4, unit 30 is so positioned upon drill 2 that it contacts the work piece only after the drilling of the hole is substantially complete. Under some circumstances, unit 30 may be at the tip of the drill positioned with the cutting edges 42 and 44 in alignment with the point of the drill. Unit 30 may then be used as a slip renewable pushing so as to guide the drill in a jig. With such an arrangement, the jig is placed on the work piece with the fixed bushings in place, and the drill with unit 30 in place is moved downwardly into the fixed bushing without the necessity for a separate slip renewable bushing. Unit 30 has been referred to as a deburring and chamfering unit but, broadly speaking, the unit may be considered a tool for removing metal or other material from the work piece at the mouth or near end of the drill.

The embodiment of FIGURE 5 includes a unit 60 which is very similar to unit 30, and is mounted in an identical manner. Unit 60 has an annular upper body portion 64 and two downwardly-projecting, identical tool elements 68 and 70, which are similar to tool elements 38 and 40 of unit 30. However, tool elements 68 and 70 are relatively short and are defined by flat or plane side surfaces 72 and 74, respectively, which extend at angles to the vertical, as shown. Thus, tool elements 68 and 70 approximate short spiral portions, but are not true spirals. Threaded into a bore in body portion 64 is a screw 80 which is identical with screw 50 in its relative position in unit 60, and in its functioning. That is, screw 70 bears against the trailing surface of the flute so as to maintain unit 60 in the proper operating relationship with respect to the cutting edges and margins of the drill.

As many possible embodiments may be made of the mechanical features of the above invention and as the art herein set forth might be varied in various parts, all without departing from the scope of the invention, it is to be understood that all matter hereinabove set forth, or shown in the accompanying drawings is to be interpreted as illustrative, and not in a limiting sense.

I claim:

1. In apparatus of the character described, a combined tool comprising, a rotary cutting tool which has flutes and adjacent margins and is adapted to remove material in forming a hole, a unit mounted upon said tool and presenting a pair of radial cutting edges which extend through a zone at the radius of the hole and are moved by the movement of the tool toward the work piece, said unit including guide means which contacts the tool surfaces of the tool so as to guide the unit along the margins, and supporting means resiliently positioning said unit in a predetermined axial position along said flutes.

2. Apparatus as described in claim 1, wherein said supporting means comprises a spring attached at one end to said unit and at the other end to said tool.

3. Apparatus as described in claim 1, wherein said supporting means comprises a spiral spring having a plurality of turns surrounding the tool and having one end attached to said unit and the other end fixed to the shank of the tool with relative slippage between.

4. Apparatus as described in claim 1, wherein said tool is a drill having spiral flutes separated by spiral lands and adjacent margins.

5. Apparatus as described in claim 4, wherein said unit comprises a substantially cylindrical body portion and a plurality of tool elements integral therewith, each of said tool elements being generally spiral and projecting along a land of said drill and terminating in a tip which has a cutting edge.

6. Apparatus as described in claim 5, wherein each of said tool elements nests along the trailing ledge of a margin of the drill with the cutting edge extending radially inwardly beyond the cutting edge of the margin.

7. Apparatus as described in claim 5, wherein said tool elements extend axially along said drill for sufficient distance to provide for the discharge of chips between said tool elements and above the surface of a jig positioned on the work piece with the outset acting as a drill positioning bushing during the initial period of the drilling operation.

References Cited in the file of this patent

UNITED STATES PATENTS

| | | |
|---|---|---|
| 1,961,604 | Broemme et al. | June 5, 1934 |
| 2,949,618 | Peyser et al. | Aug. 23, 1960 |

FOREIGN PATENTS

| | | |
|---|---|---|
| 954,456 | France | June 13, 1949 |